United States Patent
Tran et al.

(10) Patent No.: US 10,353,384 B1
(45) Date of Patent: Jul. 16, 2019

(54) AUDIO PLAYBACK USING RADIO-FREQUENCY IDENTIFICATION TAG

(71) Applicants: STMicroelectronics, Inc., Coppell, TX (US); STMicroelectronics (Grenoble 2) SAS, Grenoble (FR)

(72) Inventors: John Tran, Austin, TX (US); Gwenael Maillet, Grenoble (FR)

(73) Assignees: STMICROELECTRONICS, INC., Coppell, TX (US); STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 16/027,127

(22) Filed: Jul. 3, 2018

(51) Int. Cl.
*G05B 19/42* (2006.01)
*G08C 17/02* (2006.01)
*G06K 7/10* (2006.01)

(52) U.S. Cl.
CPC ......... *G05B 19/42* (2013.01); *G06K 7/10316* (2013.01); *G08C 17/02* (2013.01)

(58) Field of Classification Search
CPC ..... G05B 19/42; G06K 7/10316; G08C 17/02
USPC ...................................................... 340/10.1
See application file for complete search history.

(56) References Cited

U.S. PATENT DOCUMENTS

| | | | | |
|---|---|---|---|---|
| 2009/0088077 A1* | 4/2009 | Brown | ............... | H04B 5/02 455/41.2 |
| 2009/0109003 A1* | 4/2009 | Tucker | ............... | H03H 7/40 340/10.1 |
| 2009/0174592 A1* | 7/2009 | Muellner | ............ | G06K 19/0723 342/51 |
| 2009/0251289 A1* | 10/2009 | Amtmann | ............. | G06F 21/445 340/10.1 |
| 2011/0084807 A1* | 4/2011 | Logan | ............... | H04Q 9/00 340/10.1 |
| 2011/0248834 A1* | 10/2011 | Warner | ............... | H04Q 9/00 340/10.34 |
| 2011/0273271 A1* | 11/2011 | Alicot | ............... | G06K 7/0008 340/10.1 |
| 2013/0015798 A1* | 1/2013 | Wright | ............... | H03K 7/08 318/400.25 |
| 2014/0086301 A1* | 3/2014 | Akhavan | ............ | H04L 25/03828 375/238 |
| 2014/0249825 A1* | 9/2014 | Proud | ............... | G08C 17/02 704/275 |

(Continued)

FOREIGN PATENT DOCUMENTS

JP 2012134721 A * 7/2012

*Primary Examiner* — Hirdepal Singh
(74) *Attorney, Agent, or Firm* — Slater Matsil, LLP

(57) ABSTRACT

A radio-frequency identification (RFID) device includes an RFID block configured to support RFID communication; a memory having a storage area configured to store a list of pulse width modulation (PWM) parameters; a PWM circuit configured to generate a PWM signal based on a PWM parameter received by the PWM circuit; and a configuration and control (CC) circuit coupled to the RFID block, the memory, and the PWM circuit, where the RFID block, the PWM circuit, the CC circuit, and the memory form part of an RFID tag, where the CC circuit is configured to, in an automatic playback mode: sequentially read the list of PWM parameters from a beginning of the list of PWM parameters; and sequentially send the list of PWM parameters to the PWM circuit.

21 Claims, 6 Drawing Sheets

(56) References Cited

U.S. PATENT DOCUMENTS

| | | | | |
|---|---|---|---|---|
| 2015/0303992 A1* | 10/2015 | Kim | ........................ | H03K 7/08 |
| | | | | 455/41.1 |
| 2016/0019404 A1* | 1/2016 | Powell | ............... | G06K 7/10128 |
| | | | | 340/10.1 |
| 2017/0017814 A1* | 1/2017 | Roberts | .............. | G06K 7/10128 |
| 2018/0041201 A1* | 2/2018 | Tang | ....................... | H02M 1/14 |

* cited by examiner

AUDIO PLAYBACK USING RADIO-FREQUENCY IDENTIFICATION TAG

PRIORITY CLAIM AND CROSS-REFERENCE

This application is related to French Patent Application No. 1851735, filed Feb. 27, 2018, entitled "Variable Power Control System," French Patent Application No. 1851737, filed Feb. 27, 2018, entitled "Generating a PWM signal," and French Patent Application No. 1851738, filed Feb. 27, 2018, entitled "RFID Control Interface," which applications are hereby incorporated by reference in their entireties.

TECHNICAL FIELD

The present invention relates generally to systems and methods for radio-frequency identification (RFID) tags, and, in particular embodiments, to systems and methods for audio playback using RFID tags.

BACKGROUND

RFID is used to uniquely identifying items using radio waves. A typical RFID system comprises an RFID tag and an RFID reader (also referred to as a reader, or a reader device). The RFID reader sends an interrogating signal (e.g., a radio-frequency signal) to the RFID tag, and the RFID tag responds with its unique information. RFID systems may operate at various frequency ranges, e.g., a low frequency (LF) range between 125 KHz and 134 KHz, a high frequency (HF) of 13.56 MHz, or an ultra-high frequency range between 856 MHz and 928 MHz. Various industry standards exist for RFID communication, e.g., ISO 15693, ISO 18000, and ISO 24730.

Near-field communication (NFC) is a subset of the RFID communication and operate at the same frequency (e.g., 13.56 MHz) as HF RFID readers and tags. Various standards for NFC exists, such as ISO/IEC 14443, ISO/IEC 18092, and ISO/IEC 21481. While RFID system may work for distances up to hundreds of meters, near-field communication typically works at a short distance, e.g., a few centimeters. Due to its short read range and the security associated with such a short communication distance, NFC systems have been used in applications such as contactless payment, electronic ID card, and electronic keycard.

SUMMARY

In some embodiments, a radio-frequency identification (RFID) device includes an RFID block configured to support RFID communication; a memory having a storage area configured to store a list of pulse width modulation (PWM) parameters; a PWM circuit configured to generate a PWM signal based on a PWM parameter received by the PWM circuit; and a configuration and control (CC) circuit coupled to the RFID block, the memory, and the PWM circuit, where the RFID block, the PWM circuit, the CC circuit, and the memory form part of an RFID tag, where the CC circuit is configured to, in an automatic playback mode: sequentially read the list of PWM parameters from a beginning of the list of PWM parameters; and sequentially send the list of PWM parameters to the PWM circuit.

In some embodiments, a method of operating a radio-frequency identification (RFID) tag includes operating the RFID tag in an automatic playback mode, which includes: reading, by a configuration and control (CC) circuit of the RFID tag, a first pulse width modulation (PWM) parameter from a first address of a data storage area of the RFID tag, where the first address is pointed to by an address counter, where the address counter is configured to point to a beginning of the data storage area after power up; sending, by the CC circuit, the first PWM parameter to a PWM circuit of the RFID tag; and generating, by the PWM circuit, a first PWM signal in accordance with the first PWM parameter at an output port of a first output channel of the PWM circuit.

In some embodiments, a method of operating a radio-frequency identification (RFID) tag includes receiving, by an RFID block of the RFID tag, pulse width modulation (PWM) parameters from an RFID-enabled device, the PWM parameters comprising audio information of an audio message; recording, on a non-volatile memory of the RFID tag, the PWM parameters; reading, by a control circuit of the RFID tag, the PWM parameters sequentially from the non-volatile memory; transferring, by the control circuit of the RFID tag, the PWM parameters to a PWM circuit of the RFID tag; and generating, by the PWM circuit of the RFID tag, an audio signal for each of the PWM parameters transferred from the control circuit, where a frequency of the audio signal is specified by the respective PWM parameter.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be re-described in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely systems and methods for audio playback using an RFID tag.

Figure 1:
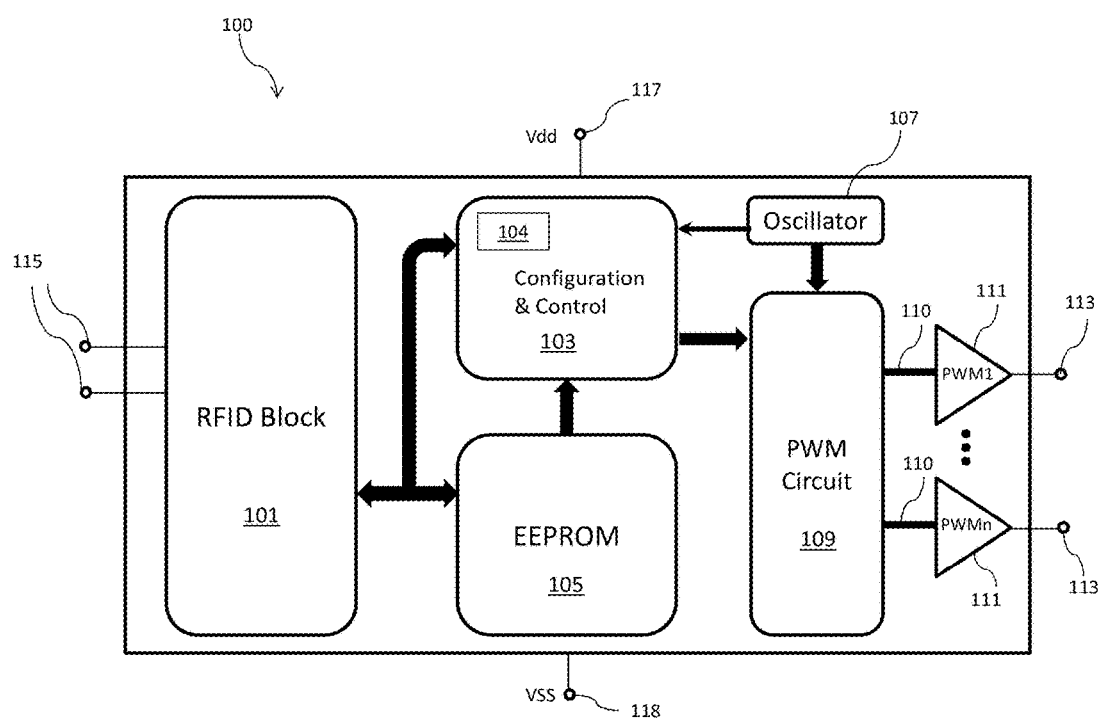
FIG. 1 illustrates a block diagram of an RFID tag, in some embodiments.

FIG. 1 illustrates a block diagram of an RFID tag 100, in some embodiments. The RFID tag 100 includes an RFID block 101, a configuration and control (CC) circuit 103, a memory module 105, an oscillator 107, a pulse-width modulation (PWM) circuit 109, and buffers 111. For simplicity, not all features of the RFID tag 100 are illustrated in FIG. 1. The RFID tag 100 of FIG. 1 may be formed as a stand-alone RFID tag, or may be formed with additional functional blocks to form an RFID device with enhanced functions.

The RFID block 101 comprises circuits that provide the capability for the RFID tag 100 to communicate wirelessly with a reader. The RFID block 101 may support one or more of the standards for RFID communication and/or NFC communication. The RFID block 101 may also support proprietary wireless communication protocols. As illustrated in FIG. 1, the RFID block 101 has terminals 115 for connecting to an antenna (see, e.g., 133 in FIG. 3). In some embodiments, through the RFID block 101, a reader device can access (e.g., read and/or write) the memory module 105 and a memory region (e.g., a register region 104) of the CC circuit 103. For example, through the RFID block 101, the reader device may set the operational mode of the RFID tag 100, and may send audio data to the RFID tag 100 for playback. FIG. 1 illustrates data paths (e.g., bi-directional data paths, or one direction data paths) between various blocks of the RFID tag 100. The data paths may be used to transmit/receive signals for control purpose and/or for data access (e.g., read/write) purpose.

The memory module 105 comprises a non-volatile memory, such as an electrically erasable programmable read-only memory (EEPROM), in some embodiments. The memory module 105 may be partitioned into different regions to store different types of data. An example partitioning of the memory module 105 is illustrated in FIG. 2.

Figure 2:
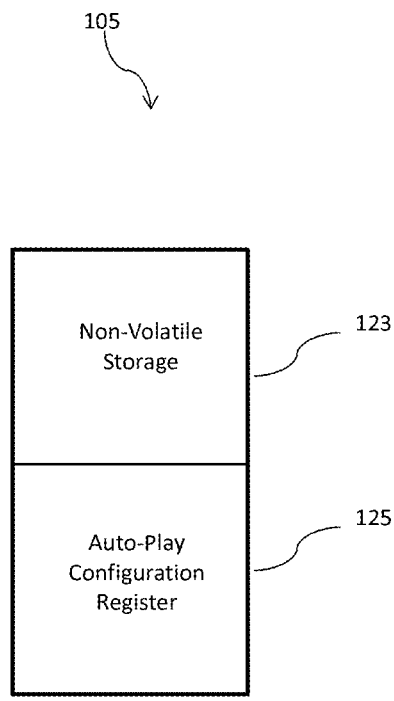
FIG. 2 illustrates the partition of a memory module of an RFID tag, in some embodiments.

In the example of FIG. 2, the memory module 105 (e.g., an EEPROM) is partitioned into a non-volatile storage region 123 and an auto-play configuration register region 125. The memory module 105 may include other storage regions that are not illustrated in FIG. 2. The non-volatile storage region 123 is used to store audio data for the automatic playback mode (details discussed hereinafter), which audio data may be written into the non-volatile storage region 123 by the reader device, in some embodiments. The auto-play configuration register region 125 may be used to store setting related to the automatic playback mode. The partition illustrated in FIG. 2 is merely an example, other partitions of the memory module 105 are possible and are fully intended to be included within the scope of the present disclosure.

Referring back to FIG. 1, the RFID tag 100 includes the CC circuit 103. In the illustrated embodiment, the CC circuit 103 has a register region 104. The register region 104 may be used to store audio data in the live-update playback mode. The CC circuit 103 comprises a state machine, in some embodiments. The state machine includes circuits configured to perform a sequence of pre-determined operations depending on a sequence of events presented to the state machine, in some embodiments. In accordance with some embodiments, the state machine of CC circuit 103 controls the operation of the RFID tag 100 based on the setting for the operation mode of the RFID tag 100, and no microcontroller (MCU) is used (e.g., formed) in the RFID tag 100. Note that an MCU here refers to a small computer on a single integrated circuit, and may include one or more central processing units (CPUs) along with integrated memory and input/output (IO) peripherals. By using a state machine instead of an MCU for controlling the operation of the RFID tag 100, cost of the RFID tag 100 is greatly reduced. Details of the operation of the CC circuit 103 are discussed hereinafter.

The PWM circuit 109 includes circuits for generating PWM waveforms (e.g., comprising "zero" and "one" logic levels) with specified frequencies and duty cycles, based on the audio data received from the CC circuit 103. The PWM waveform (also referred to as PWM signal), after being converted into an analog signal by, e.g., a speaker 137 (see FIG. 3), corresponds to an audio signal such as an audio tone having a specific frequency. Therefore, the PWM waveform, generated by the PWM circuit 109 based on the audio data, may also be referred to as an audio signal or an audio tone. In some embodiments, the PWM circuit 109 has one or more output channels for outputting audio signals, and each of the output channels has a corresponding output port 110. In the illustrated embodiment, the audio signal at each of the output port 110 is a digital signal (e.g., a PWM waveform) corresponding to an audio tone having a frequency (e.g., an audible frequency). In other words, each audio tone may be a single frequency tone. The audio tone at each output port 110 may change over time, e.g., based on the audio data received.

In the illustrated embodiment, the audio data are organized and transmitted as PWM parameters. In an embodiment, a PWM parameter includes a PWM channel ID and a PWM tone value, where the PWM tone value further includes a PWM enable signal, a PWM frequency, and a PWM pulse width. The PWM channel ID indicates which one of the output channels of the PWM circuit 109 is the PWM parameter intended for (e.g., controlled by the PWM parameter). The PWM enable signal indicates the state (e.g., ON or OFF) of the PWM channel specified by the PWM channel ID. When the PWM enable signal is ON, the corresponding output channel is enabled and outputs an audio tone; when the PWM enable signal is OFF, the corresponding output channel is turned off (e.g., no audio signal is generated). The PWM frequency indicates the frequency of the audio tone to be generated at the output channel indicated by the PWM channel ID. In some embodiments, the audio tone is generated by the PWM circuit 109 using a digital waveform, e.g., a waveform derived from an output of the oscillator 107. The PWM pulse width and the PWM frequency indicate the duty cycle of the PWM waveform, in some embodiments. For example, the duty cycle of the PWM waveform may be computed by dividing the pulse width (e.g., indicated by the PWM pulse width) of the PWM waveform by the period of the PWM waveform. Since the period of the PWM waveform is inversely proportional to the frequency of the PWM waveform, the PWM frequency stores a value that is proportional to the period of the PWM waveform, in some embodiments. For example, denote the period of a reference clock signal generated by the oscillator 107 as $T_{ref}$, then the PWM frequency may have a value of N, which means that the period of the PWM waveform is $N \times T_{ref}$. In other embodiments, the PWM frequency stores a value that is proportional to the frequency of the PWM waveform, in which case the period of the PWM waveform may be computed from the frequency of the PWM waveform. In some embodiments, the PWM circuit 109, based on the PWM parameter received, generates a PWM waveform with a frequency specified by the PWM frequency and a duty cycle specified by the PWM pulse width and the PWM frequency, at an output channel specified by the PWM channel ID, when the output channel is enabled (e.g., PWM enable signal is ON).

Still referring to FIG. 1, the oscillator 107 provides a clock signal to drive the circuits of the RFID tag 100, and is used as a reference for timing. Any suitable oscillator may be used, and thus, details are not repeated here. FIG. 1 further illustrates one or more buffers 111 coupled between output ports 110 of the PWM circuit 109 and respective output terminals 113 of the RFID tag 100. The buffers 111 may be any suitable buffers (e.g., transistors, open-collector drives), and may be used to shift voltages of the PWM waveforms from the internal power domain (e.g., voltage levels within the RFID tag 100) to the external power domain (e.g., voltage levels outside the RFID tag 100). In some embodiments, the buffer 111 is formed using NMOS and PMOS techniques, and may have multiple NMOS/PMOS stages in parallel in order to adjust the output current to, e.g., provide improved driving capability at the output terminals 113. In the illustrated embodiment, the outputs of the buffers 111 are digital signal (e.g., PWM waveforms buffered by the buffers 111), and are sent to the output terminals 113. The output terminals 113 are configured to be coupled to piezoelectric transducers (e.g., speakers), in the illustrated embodiments. In addition, FIG. 1 illustrates a power supply terminal 117 (e.g., a voltage supply terminal Vdd) and a reference voltage terminal 118 (e.g., electrical ground Vss) for the RFID tag 100.

The block diagram illustrated in FIG. 1 is merely an example and not limiting. Other configurations are possible and are fully intended to be included within the scope of the present disclosure. For example, the RFID tag may not need an external power supply as illustrated in FIG. 1, and instead, an energy harvest circuit (see 119 in FIG. 4) may be formed inside the RFID tag to harvest, e.g., electromagnetic energy from the RFID reader and to power the RFID tag. Since the RFID block 101 may support RFID communication and/or NFC communication, the RFID tag 100 may also be referred to as an NFC tag.

Figure 3:
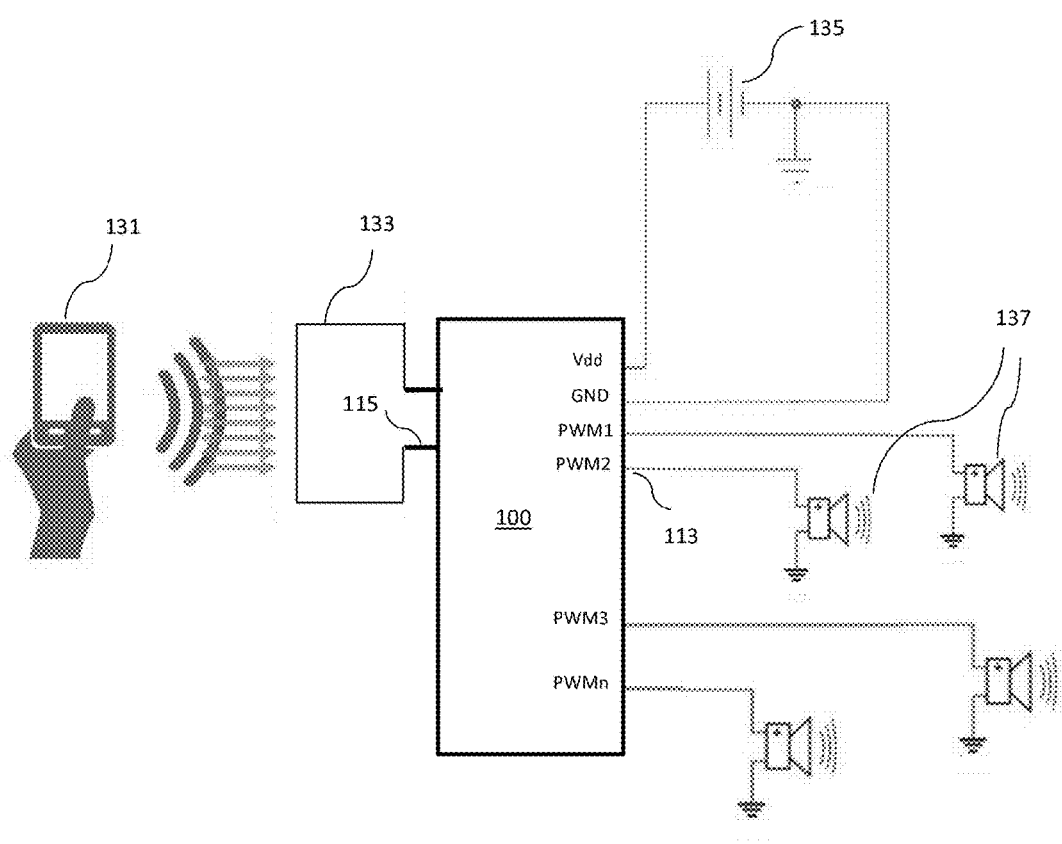
FIG. 3 illustrates a schematic view of a system for audio playback using an RFID tag, in some embodiments.

FIG. 3 illustrates a schematic view of a system for audio playback using the RFID tag 100, in some embodiments. In FIG. 3, the terminals 115 of the RFID tag 100 are connected to an antenna 133. The output terminals 113 of the RFID tag 100 are connected to a plurality of speakers 137. In the example of FIG. 3, four speakers 137 are illustrated as an example. The number of speakers connected to the RFID tag 100 may be more or less than four, depending on the application and the design of the system. By having one or more output channels coupled to one or more speakers 137, mono-sound, two-channel stereo sound, or multi-channel (e.g., more than 2) sound may be produced by the system of FIG. 3. FIG. 3 also illustrates a power supply 135 (e.g., battery) coupled to the RFID tag 100. In addition, an RFID reader 131, such as an RFID-enabled (or NFC-enabled) smart phone, may be used to interact with the RFID tag 100 for, e.g., setting the operation mode of the RFID tag 100, or writing audio data into the non-volatile memory of the RFID tag 100 for auto-playback.

The RFID tag 100 may operate in an automatic playback mode or a live-update mode, depending on the settings of the RFID tag 100. Various operation modes of the RFID tag 100 are discussed hereinafter with reference to FIGS. 1-3.

In the automatic playback mode, after power up (or after a reset), the RFID tag 100 automatically plays back an audio message stored (e.g., in the format of a list of PWM parameters) in the non-volatile storage region 123 of the memory module 105, where the PWM parameters are written to the non-volatile storage region 123 by the RFID reader 131. The playback automatically loops around to the beginning of the audio message once the end of the audio message is reached.

To set the operation mode of the RFID tag 100, the RFID reader 131 may set the corresponding value of a configuration register located in the memory module 105 via the RFID block 101. The value of the configuration register indicating the operation mode may then be read into and stored in, e.g., the register region 104 (see FIG. 1) of the CC circuit 103 after a power up (or after a reset). For the automatic playback mode, the RFID reader 131 may write additional parameters, such as a time base value, into the auto-play configuration register region 125 (see FIG. 2) of the memory module 105. The time base value is used to indicate a time interval between two consecutive updates of PWM parameters, as discussed below. In addition, audio data, such as PWM parameters, are written into the non-volatile storage region 123 (see FIG. 2) of the memory module 105 by the RFID reader via the RFID block 101. The audio data may contain audio information, which when converted into analog audio signal by, e.g., the speakers 137, turns into an audio message comprising speech, sound, music, or the like.

Once the RFID tag 100 is set in the automatic playback mode, after a power up (or after a reset), the CC circuit 103 (e.g., a state machine) reads the time base value stored in the memory module 105 (e.g., in the auto-play configuration register region 125) and stores the time base value in, e.g., the register region 104 of the CC circuit 103. The CC circuit 103 also reads, from the beginning of the non-volatile storage region 123 (e.g., the region storing the PWM parameters), a first PWM parameter. In other words, the first PWM parameter is stored at the first address of the non-volatile storage region 123. In some embodiments, the CC circuit 103 uses an address counter to point to the address of the PWM parameter being read, and therefore, the address counter may be reset to a value of zero after power up (or after reset), where a value of zero corresponds to the first address (the beginning address) of the non-volatile storage region 123. The CC circuit 103 then transfers the first PWM parameter to the PWM circuit 109. The PWM circuit 109, based on the first PWM parameter, generates a PWM signal (e.g., an audio tone) with a frequency at an output channel specified by the first PWM parameter, when the state of the output channel is ON (as indicated by the first PWM parameter). In embodiments where the state of the output channel is indicted to be OFF by the PWM parameter, no audio signal is generated at the output channel specified by the PWM channel ID.

After transferring the first PWM parameter to the PWM circuit 109, the CC circuit 103 increments the address counter by one to point to the next PWM parameter's address in the non-volatile storage region 123, in preparation for reading the next PWM parameter, in some embodiments. One skilled in the art will appreciate that although the value of the address counter is incremented by one, when reading from the non-volatile storage region 123, the physical address used may be obtained by, e.g., multiplying the value of the address counter by the size of the PWM parameter. For example, if the PWM parameter has a size of three bytes, then an address counter value of one corresponds to a physical address of three (in units of byte), assuming the beginning physical address is zero.

In addition, after transferring the first PWM parameter to the PWM circuit 109, the CC circuit 103 may, e.g., start a timer to count the time elapsed after transferring the first PWM parameter to the PWM circuit 109. When the time elapsed is equal to the time base value (e.g., a pre-determined time interval), the CC circuit 103 reads a second PWM parameter from the non-volatile storage region 123 and transfers the second PWM parameter to the PWM circuit 109, where the address of the second PWM parameter is pointed to by the (incremented) address counter, in some embodiments.

In some embodiments, the second PWM parameter instructs the PWM circuit 109 to generate another audio tone different from the audio tone specified by the first PWM parameter at another output channel of the PWM circuit 109. In some embodiments, the second PWM parameter instructs the PWM circuit 109 to turn off the output channel specified by the first PWM parameter (e.g., by setting the PWM enable signal to OFF). The time base value may be set to a very small value (e.g., a few milliseconds or shorter), and therefore, although different output channels of the PWM circuit 109 may be turned on (e.g., to produce audio tones) at slightly different time instants, for human listeners, it may sound as if all the output channels are turned on simultaneously, in some embodiments.

After the second PWM parameter is transferred to the PWM circuit 109, the CC circuit increments the address counter by one again, and starts the timer to wait for the pre-determined time interval indicated by the time base value. Once the pre-determined time interval elapses, the CC circuit 103 reads the next PWM parameter and transfers it to the PWM circuit 109. These operations repeat until all of the PWM parameters stored in the non-volatile storage region 123 are read by the CC circuit 103 and transferred to the PWM circuit 109.

In some embodiments, each time the address counter is incremented by one, the CC circuit 103 checks if all the PWM parameters in the list of PWM parameters have been read by the CC circuit 103. For example, the CC circuit 103 may check if the address counter, after being incremented by one, points to an address beyond the address of the last PWM parameter (e.g., the ending PWM parameter) in the list of the PWM parameters stored in the non-volatile storage region 123. Depending on how the address checking is implemented, a boundary address, which indicates the address of the last PWM parameter or the first address beyond the address of the last PWM parameter, may be written by the RFID reader 131 into the auto-play configuration register region 125 at the time when the PWM parameters are stored into the non-volatile storage region 123, and may be read by the CC circuit 103 after power up (or after reset) and stored in the register region 104 for address checking. The CC circuit 103 may compare the incremented counter address with the boundary address to check whether the last PWM parameter has been read by the CC circuit.

Once the CC circuit 103 detects that the last PWM parameter in the list of PWM parameters has been read, the CC circuit 103 resets the address counter, e.g., to zero, such that the address counter points to the beginning of the non-volatile storage region 123. Therefore, playback of the audio message loops back to the beginning when the end of the audio message is reached. In other words, in the automatic playback mode, the CC circuit 103 sequentially read each of the PWM parameters from the beginning of the list of PWM parameters, and send each of the PWM parameters sequentially to the PWM circuit 109. After the last PWM parameter in the list of PWM parameters is sent to the PWM circuit 109, the CC circuit 103 sequentially reads each of the PWM parameters again starting from the beginning of the list of PWM parameters, and sends each of the PWM parameters to the PWM circuit 109 again.

The RFID tag 100 may operate in the live-update mode. In the live-update mode, the audio message to be played back by the RFID tag 100 is not saved in the RFID tag 100 beforehand. Instead, the RFID reader 131 sends a sequence of audio parameters same as or similar to the PWM parameters to the RFID tag 100. The RFID tag 100, controlled by the state machine of the CC circuit 103, transfers each received audio parameter to the PWM circuit 109 for playback in real-time.

To set the live-update mode, the RFID reader 131 sets the corresponding value of the configuration register in the non-volatile memory region 105 via the RFID block 101, and the value of the configuration register is loaded (e.g., read into) into the register region 104 (see FIG. 1) of the CC circuit 103 after power up (or after reset), in some embodiments. The register region 104 may include registers for storing the audio parameter (e.g., a PWM parameter) send by the RFID reader 131. Note that the registers in the register region 104 are volatile memories, in the illustrated embodiment.

In the live-update mode, the RFID reader 131 sends an audio parameter to the RFID tag 100 one at a time, in some embodiments. The audio parameter may have a same format as the PWM parameter used in the automatic playback mode, although the audio parameter may alternatively use a different format. RFID block 101 writes the received audio parameter to the registers in the register region 104 of the CC circuit 103. The CC circuit 103 then transfers the audio parameter to the PWM circuit 109 without the use of a micro-controller. For each received audio parameter, the PWM circuit 109 generates a PWM signal (e.g., an audio tone) with a frequency at an output channel of the PWM circuit 109 that are specified by the received audio parameter, such that the audio message is played back in real-time. The duration of the audio tone at the output channel is controlled by the RFID reader 131. For example, the RFID reader 131 waits for a period of time, then sends another audio parameter to the RFID tag 100. The another audio parameter may be used to turn off an audio tone generated by a previously received audio parameter, or may be used to generate another audio tone at a different output channel of the PWM circuit 109.

Figure 4:
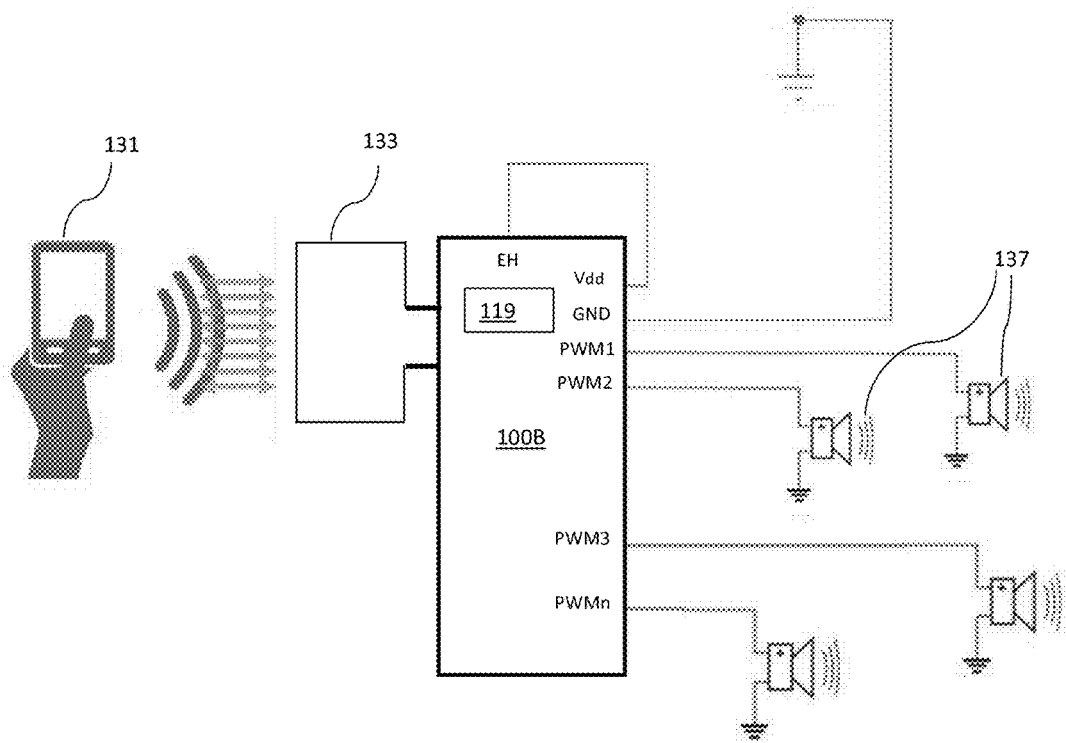
FIG. 4 illustrates a schematic view of another system for audio playback using an RFID tag, in some embodiments.

FIG. 4 illustrates a schematic view of another system for audio playback using an RFID tag 100B, in some embodiments. The RFID tag 100B is similar to the RFID tag 100 of FIG. 1, but with an energy harvest circuit 119. The energy harvest circuit 119 may include circuits for harvesting energy from, e.g., electromagnetic waves from the RFID reader 131 to power the RFID tag 100B. Therefore, in FIG. 4, the output (e.g., a voltage at the EH terminal) of the energy harvest circuit 119 is coupled to the power supply terminal 117 (e.g., the Vdd terminal), and no external battery is needed for the RFID tag 100B to operate.

Figure 5:
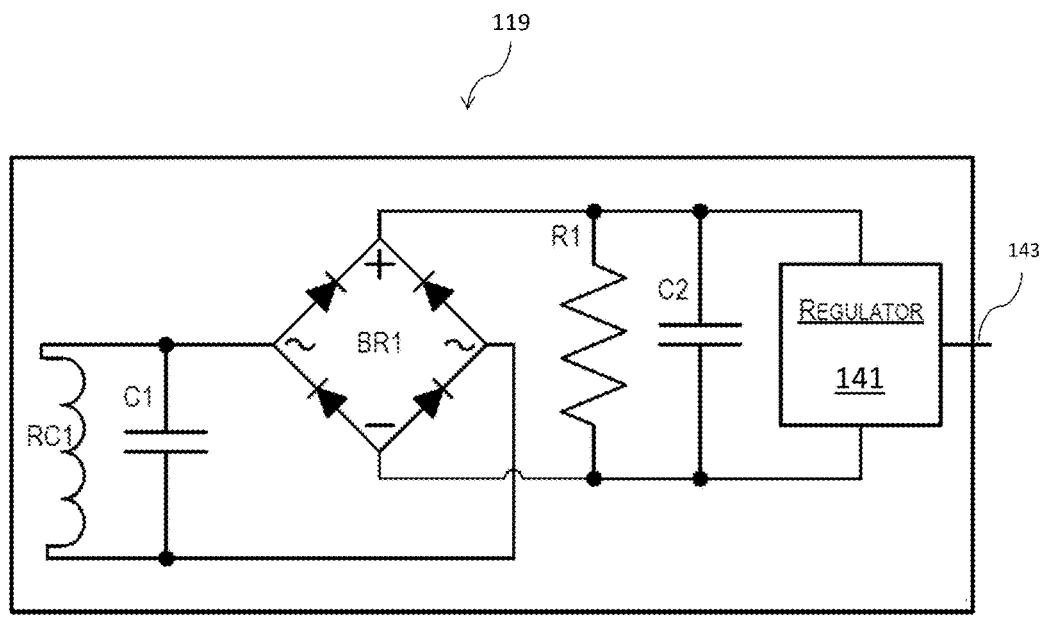
FIG. 5 illustrates a block diagram of an energy harvest circuit, in some embodiments.

FIG. 5 illustrates a block diagram of the energy harvest circuit 119 in FIG. 4, in an embodiment. FIG. 5 is merely an example, and any other suitable energy harvest circuits may also be used and are fully intended to be included within the scope of the present disclosure. In some embodiments, the energy harvest circuit 119 is configured to harvest energy, e.g., by receiving a voltage wirelessly from an RFID reader. The energy harvest circuit 119 may comprise a receiver coil RC1, a rectifier circuit (e.g., comprising capacitor C1 and rectifier BR1), and a regulator 141 (e.g., a buck-boost regulator). If or when the receiver coil RC1 is placed at a distance near an RFID reader, an AC power may be induced in the receiver coil RC1. The AC power may be rectified by the rectifier circuit and regulated to an appropriate voltage level by the regulator 141. The output voltage from the regulator 141 is sent out at an output terminal 143.

Variations to the disclosed embodiments are possible and are fully intended to be included within the scope of the present disclosure. For example, in the automatically playback mode, besides the PWM channel ID and the PWM tone value, the PWM parameter may additionally include a PWM tone duration. The PWM tone duration may have a value that is an integer multiple (e.g., one, two, three, . . . ) of the time base value. The PWM tone duration is used to indicate the duration of the audio tone specified by the PWM parameter. In other words, each of the audio tone may end (e.g., be turned off) after the time interval specified by the PWM tone duration without the need for another PWM parameter to turn the audio tone off. The additional of the PWM tone duration to the PWM parameter allows for more flexibility in representing the audio message using the PWM parameters. As another example, a new parameter may be added to the PWM parameter to turn off an audio tone, and to allow a new audio tone to be output at a different output channel while keeping the previous audio tone on. In the discussion above, the CC circuit 103 read only one PWM parameter at a time, and therefore, controls one output channel of the PWM circuit 109 at a time. In other embodiments, the PWM parameters for multiple output channels of the PWM circuit 109 may be combined to form a PWM parameter set, and the CC circuit 103 may read a PWM parameter set each time and transfer the PWM parameter set to the PWM circuit 109. The PWM circuit 109 may include multiple (e.g., parallel) audio signal generation blocks such that multiple audio tones may be generated simultaneously. The PWM parameter set thus allows multiple audio tones to be generated and outputted simultaneously at multiple output channels of the PWM circuit 109.

Audio playback systems such as those illustrated in FIGS. 3 and 4 have wide applications. For example, an RFID tag such as those disclosed herein may be attached to, or placed near, a display object (e.g., a painting in a museum, or a product on display). By tapping an NFC-enabled smart phone or a reader device on the RFID tag, a pre-recorded audio message may be played back to provide introduction to the display object. Similar systems may be used to help visually impaired people or be used in augmented reality applications, where by pushing a button or by tapping the RFID tag with an NFC-enabled reader device, audio messages (e.g., voice, sound, music) may be played back. Another application is personalized greeting card with an RFID tag, where an user may record a greeting message on a smart phone with an RFID application installed. The recorded greeting message may then be stored in the non-volatile storage region of the RFID tag using the smart phone RFID application. The RFID tag is set to the automatically playback mode, such that when the greeting card is opened by the recipient, the greeting message is played back automatically. Other suitable applications are also possible, and are fully intended to be included within the scope of the present disclosure.

Figure 6:
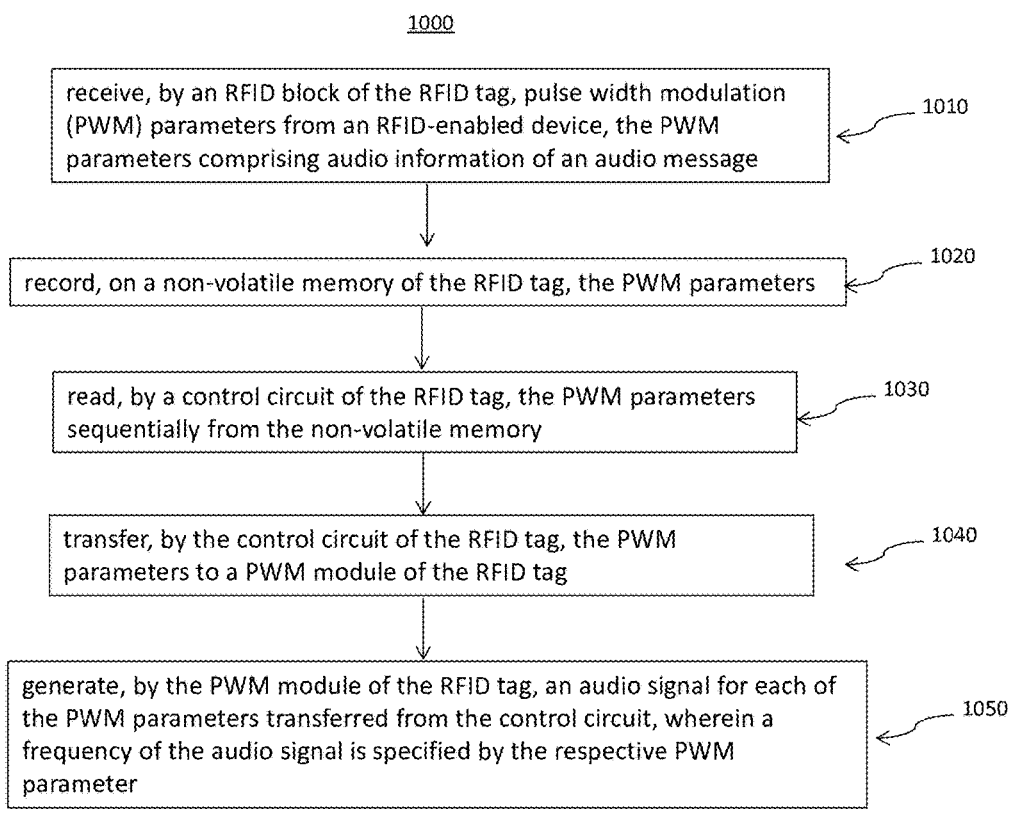
FIG. 6 illustrates a flow chart of a method for operating an RFID tag, in some embodiments.

FIG. 6 illustrates a flow chart of a method 1000 of operating an RFIF tag, in some embodiments. It should be understood that the embodiment method shown in FIG. 6 is merely an example of many possible embodiment methods. One of ordinary skill in the art would recognize many variations, alternatives, and modifications. For example, various steps as illustrated in FIG. 6 may be added, removed, replaced, rearranged and repeated.

Referring to FIG. 6, at step 1010, pulse width modulation (PWM) parameters are receive by an RFID block of the RFID tag, where the PWM parameters are transmitted from an RFID-enabled device, and the PWM parameters include audio information of an audio message. At step 1020, the PWM parameters are recorded on a non-volatile memory of the RFID tag. At step 1030, the PWM parameters are read sequentially from the non-volatile memory by a control circuit of the RFID tag. At step 1040, the PWM parameters are transferred to a PWM circuit of the RFID tag by the control circuit of the RFID tag. At step 1050, an audio signal is generated by the PWM circuit of the RFID tag for each of the PWM parameters transferred from the control circuit, where a frequency of the audio signal is specified by the respective PWM parameter.

Embodiments may achieve advantages. For example, the disclosed RFID tags allow high quality digital audio data to be transferred from the RFID reader (e.g., an NFC-enabled smart phone) to the RFID tag using an inexpensive RFID block. The playback of the audio messages is controlled by a state-machine (e.g., the CC circuit 103), thus there is no need to integrate a micro-controller (MCU) into the RFID tag. Compared with a reference design of an integrated circuit with audio playback capability, where the reference design has an integrated MCU and an wireless interface such as blue-tooth interface for transferring audio data, the presently disclosed RFID tags provide lower cost solutions. With the energy harvest circuit, battery is not needed for operation of the RFID tag, thus further reducing the system cost.

Example embodiments of the present invention are summarized here. Other embodiments can also be understood from the entirety of the specification and the claims filed herein.

Example 1

In an embodiment, a radio-frequency identification (RFID) device includes an RFID block configured to support RFID communication; a memory having a storage area configured to store a list of pulse width modulation (PWM) parameters; a PWM circuit configured to generate a PWM signal based on a PWM parameter received by the PWM circuit; and a configuration and control (CC) circuit coupled to the RFID block, the memory, and the PWM circuit, where the RFID block, the PWM circuit, the CC circuit, and the memory form part of an RFID tag, where the CC circuit is configured to, in an automatic playback mode: sequentially read the list of PWM parameters from a beginning of the list of PWM parameters; and sequentially send the list of PWM parameters to the PWM circuit.

Example 2

The RFID device of example 1, where the CC circuit is further configured to, in the automatic playback mode: after a last PWM parameter in the list of PWM parameters is sent to the PWM circuit, sequentially read the list of PWM parameters again starting from the beginning of the list of PWM parameters; and sequentially send the list of PWM parameters to the PWM circuit again.

Example 3

The RFID device of example 1, where the PWM circuit has one or more output channels, wherein each of the one or more output channels is configured to be coupled to a respective transducer.

Example 4

The RFID device of example 3, further including one or more buffers, each of the one or more buffers configured to be coupled between an output port of an output channel of the PWM circuit and a respective transducer.

Example 5

The RFID device of example 1, where each of the list of PWM parameters includes a PWM channel ID, a PWM channel enable signal, a PWM frequency, and a PWM pulse width, where the PWM circuit is configured to, in the automatic playback mode: check if the PWM channel enable signal is ON or OFF; and in response to detecting that the PWM channel enable signal is ON, generate the PWM signal at an output channel of the PWM circuit indicated by the PWM channel ID, where the PWM signal has a frequency indicated by the PWM frequency, and a duty cycle indicated by the PWM pulse width and the PWM frequency.

Example 6

The RFID device of example 5, where the PWM circuit is configured to, in the automatic playback mode: check if the PWM channel enable signal is ON or OFF; and in response to detecting that the PWM channel enable signal is OFF, turn off an output channel of the PWM circuit indicated by the PWM channel ID.

Example 7

The RFID device of example 1, further including an energy harvest circuit configured to harvest energy from an external energy source to power the RFID device.

Example 8

The RFID device of example 1, further including an oscillator.

Example 9

The RFID device of example 1, where the CC circuit includes a state machine.

Example 10

The RFID device of example 1, where the CC circuit is configured to, in a real-time update mode: read an audio parameter from a memory location of the CC circuit, where the audio parameter is written into the memory location by an RFID reader; and send the audio parameter to the PWM circuit.

Example 11

The RFID device of example 10, where the memory location includes one or more registers of the CC circuit.

Example 12

In an embodiment, a method of operating a radio-frequency identification (RFID) tag includes operating the RFID tag in an automatic playback mode, which includes: reading, by a configuration and control (CC) circuit of the RFID tag, a first pulse width modulation (PWM) parameter from a first address of a data storage area of the RFID tag, where the first address is pointed to by an address counter, where the address counter is configured to point to a beginning of the data storage area after power up; sending, by the CC circuit, the first PWM parameter to a PWM circuit of the RFID tag; and generating, by the PWM circuit, a first PWM signal in accordance with the first PWM parameter at an output port of a first output channel of the PWM circuit.

Example 13

The method of example 12, where operating the RFID tag in the automatic playback mode further includes: incrementing, by the CC circuit, the address counter by one after sending the first PWM parameter to the PWM circuit.

Example 14

The method of example 13, where operating the RFID tag in the automatic playback mode further includes: waiting, by the CC circuit, for a first period of time specified by the first PWM parameter; reading, by the CC circuit, a second PWM parameter, after the first period of time elapses, from a second address of the data storage area pointed to by the incremented address counter; sending, by the CC circuit, the second PWM parameter to the PWM circuit; and generating, by the PWM circuit, a second PWM signal in accordance with the second PWM parameter at an output port of a second output channel of the PWM circuit.

Example 15

The method of example 14, where the second output channel is different from the first output channel.

Example 16

The method of example 14, where operating the RFID tag in the automatic playback mode further includes: after incrementing the address counter and before reading the second PWM parameter, resetting, by the CC circuit, the address counter such that the address counter points to the beginning of the data storage area if the incremented address counter points to an address beyond an end of the data storage area.

Example 17

The method of example 12, further including: operating the RFID tag in a real-time update mode, which includes: receiving, by the CC circuit, an audio parameter from an RFID reader; sending, by the CC circuit, the audio parameter to the PWM circuit of the RFID tag; and generating, by the PWM circuit, a second PWM signal in accordance with the audio parameter at an output port of a second output channel of the PWM circuit specified by the audio parameter.

Example 18

In an embodiment, a method of operating a radio-frequency identification (RFID) tag includes receiving, by an RFID block of the RFID tag, pulse width modulation (PWM) parameters from an RFID-enabled device, the PWM parameters including audio information of an audio message; recording, on a non-volatile memory of the RFID tag, the PWM parameters; reading, by a control circuit of the RFID tag, the PWM parameters sequentially from the non-volatile memory; transferring, by the control circuit of the RFID tag, the PWM parameters to a PWM circuit of the RFID tag; and generating, by the PWM circuit of the RFID tag, an audio signal for each of the PWM parameters transferred from the control circuit, where a frequency of the audio signal is specified by the respective PWM parameter.

Example 19

The method of example 18, further including: after transferring a last one of the PWM parameters to the PWM circuit, reading, by the control circuit of the RFID tag, the PWM parameters sequentially from the non-volatile memory for a second time; transferring, by the control circuit of the RFID tag, the PWM parameters to the PWM circuit for the second time; and generating, by the PWM circuit of the RFID tag, audio signals specified by the PWM parameters for the second time.

Example 20

The method of example 18, where generating the audio signal comprises generating the audio signal at an output channel of the PWM circuit, where the output channel is specified by the respective PWM parameter.

Example 21

The method of example 18, where the PWM circuit has a plurality of output channels, where generating the audio signal includes generating different audio signals at different output channels of the PWM circuit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A radio-frequency identification (RFID) device comprising:
    an RFID block configured to support RFID communication;
    a memory having a storage area configured to store a list of pulse width modulation (PWM) parameters;
    a PWM circuit configured to generate a PWM signal based on a PWM parameter received by the PWM circuit; and
    a configuration and control (CC) circuit coupled to the RFID block, the memory, and the PWM circuit, wherein the RFID block, the PWM circuit, the CC circuit, and the memory form part of an RFID tag, wherein the CC circuit is configured to, in an automatic playback mode:
        sequentially read the list of PWM parameters from a beginning of the list of PWM parameters; and
        sequentially send the list of PWM parameters to the PWM circuit.

2. The RFID device of claim 1, wherein the CC circuit is further configured to, in the automatic playback mode:
    after a last PWM parameter in the list of PWM parameters is sent to the PWM circuit, sequentially read the list of PWM parameters again starting from the beginning of the list of PWM parameters; and
    sequentially send the list of PWM parameters to the PWM circuit again.

3. The RFID device of claim 1, wherein the PWM circuit has one or more output channels, wherein each of the one or more output channels is configured to be coupled to a respective transducer.

4. The RFID device of claim 3, further comprising one or more buffers, each of the one or more buffers configured to be coupled between an output port of an output channel of the PWM circuit and a respective transducer.

5. The RFID device of claim 1, wherein each of the list of PWM parameters comprises a PWM channel ID, a PWM channel enable signal, a PWM frequency, and a PWM pulse width, wherein the PWM circuit is configured to, in the automatic playback mode:
    check if the PWM channel enable signal is ON or OFF; and
    in response to detecting that the PWM channel enable signal is ON, generate the PWM signal at an output channel of the PWM circuit indicated by the PWM channel ID, wherein the PWM signal has a frequency indicated by the PWM frequency, and a duty cycle indicated by the PWM pulse width and the PWM frequency.

6. The RFID device of claim 5, wherein the PWM circuit is configured to, in the automatic playback mode:
    check if the PWM channel enable signal is ON or OFF; and
    in response to detecting that the PWM channel enable signal is OFF, turn off an output channel of the PWM circuit indicated by the PWM channel ID.

7. The RFID device of claim 1, further comprising an energy harvest circuit configured to harvest energy from an external energy source to power the RFID device.

8. The RFID device of claim 1, further comprising an oscillator.

9. The RFID device of claim 1, wherein the CC circuit comprises a state machine.

10. The RFID device of claim 1, wherein the CC circuit is configured to, in a real-time update mode:
    read an audio parameter from a memory location of the CC circuit, wherein the audio parameter is written into the memory location by an RFID reader; and
    send the audio parameter to the PWM circuit.

11. The RFID device of claim 10, wherein the memory location comprises one or more registers of the CC circuit.

12. A method of operating a radio-frequency identification (RFID) tag, the method comprising:
    operating the RFID tag in an automatic playback mode, the operating comprising:
        reading, by a configuration and control (CC) circuit of the RFID tag, a first pulse width modulation (PWM) parameter from a first address of a data storage area of the RFID tag, wherein the first address is pointed to by an address counter, wherein the address counter is configured to point to a beginning of the data storage area after power up;
        sending, by the CC circuit, the first PWM parameter to a PWM circuit of the RFID tag; and
        generating, by the PWM circuit, a first PWM signal in accordance with the first PWM parameter at an output port of a first output channel of the PWM circuit.

13. The method of claim 12, wherein operating the RFID tag in the automatic playback mode further comprises:
    incrementing, by the CC circuit, the address counter by one after sending the first PWM parameter to the PWM circuit.

14. The method of claim 13, wherein operating the RFID tag in the automatic playback mode further comprises:
- waiting, by the CC circuit, for a first period of time specified by the first PWM parameter;
- reading, by the CC circuit, a second PWM parameter, after the first period of time elapses, from a second address of the data storage area pointed to by the incremented address counter;
- sending, by the CC circuit, the second PWM parameter to the PWM circuit; and
- generating, by the PWM circuit, a second PWM signal in accordance with the second PWM parameter at an output port of a second output channel of the PWM circuit.

15. The method of claim 14, wherein the second output channel is different from the first output channel.

16. The method of claim 14, wherein operating the RFID tag in the automatic playback mode further comprises:
- after incrementing the address counter and before reading the second PWM parameter, resetting, by the CC circuit, the address counter such that the address counter points to the beginning of the data storage area if the incremented address counter points to an address beyond an end of the data storage area.

17. The method of claim 12, further comprising:
operating the RFID tag in a real-time update mode, comprising
- receiving, by the CC circuit, an audio parameter from an RFID reader;
- sending, by the CC circuit, the audio parameter to the PWM circuit of the RFID tag; and
- generating, by the PWM circuit, a second PWM signal in accordance with the audio parameter at an output port of a second output channel of the PWM circuit specified by the audio parameter.

18. A method of operating a radio-frequency identification (RFID) tag, the method comprising:
- receiving, by an RFID block of the RFID tag, pulse width modulation (PWM) parameters from an RFID-enabled device, the PWM parameters comprising audio information of an audio message;
- recording, on a non-volatile memory of the RFID tag, the PWM parameters;
- reading, by a control circuit of the RFID tag, the PWM parameters sequentially from the non-volatile memory;
- transferring, by the control circuit of the RFID tag, the PWM parameters to a PWM circuit of the RFID tag; and
- generating, by the PWM circuit of the RFID tag, an audio signal for each of the PWM parameters transferred from the control circuit, wherein a frequency of the audio signal is specified by the respective PWM parameter.

19. The method of claim 18, further comprising:
- after transferring a last one of the PWM parameters to the PWM circuit, reading, by the control circuit of the RFID tag, the PWM parameters sequentially from the non-volatile memory for a second time;
- transferring, by the control circuit of the RFID tag, the PWM parameters to the PWM circuit for the second time; and
- generating, by the PWM circuit of the RFID tag, audio signals specified by the PWM parameters for the second time.

20. The method of claim 18, wherein generating the audio signal comprises generating the audio signal at an output channel of the PWM circuit, wherein the output channel is specified by the respective PWM parameter.

21. The method of claim 18, wherein the PWM circuit has a plurality of output channels, wherein generating the audio signal comprises generating different audio signals at different output channels of the PWM circuit.

* * * * *